United States Patent
Watkins

(10) Patent No.: US 8,280,619 B2
(45) Date of Patent: Oct. 2, 2012

(54) PORTABLE NAVIGATION APPARATUS WITH REFUELING PROMPT FUNCTION AND METHOD THEREOF

(75) Inventor: Andrew Watkins, Auckland (NZ)

(73) Assignee: Mitac International Corp., Taoyuan (TW)

( * ) Notice: Subject to any disclaimer, the term of this patent is extended or adjusted under 35 U.S.C. 154(b) by 553 days.

(21) Appl. No.: 12/585,125

(22) Filed: Sep. 4, 2009

(65) Prior Publication Data

US 2011/0060521 A1    Mar. 10, 2011

(51) Int. Cl.
*G01C 21/00* (2006.01)
*G06F 19/00* (2006.01)

(52) U.S. Cl. ............... 701/123; 701/491; 340/450.2

(58) Field of Classification Search .................. None
See application file for complete search history.

(56) References Cited

U.S. PATENT DOCUMENTS

| | | | |
|---|---|---|---|
| 5,913,917 A * | 6/1999 | Murphy | 701/123 |
| 6,591,185 B1 * | 7/2003 | Polidi et al. | 701/411 |
| 6,879,969 B2 * | 4/2005 | Engstrom et al. | 706/20 |
| 8,135,538 B2 * | 3/2012 | Geelen et al. | 701/123 |
| 8,140,335 B2 * | 3/2012 | Kennewick et al. | 704/257 |
| 2006/0058955 A1 * | 3/2006 | Mehren | 701/209 |
| 2009/0157289 A1 * | 6/2009 | Graessley | 701/123 |
| 2010/0148952 A1 * | 6/2010 | Barajas | 340/450.2 |

* cited by examiner

*Primary Examiner* — Michael J. Zanelli
(74) *Attorney, Agent, or Firm* — Wang Law Firm, Inc.; Li K. Wang; Stephen Hsu

(57) ABSTRACT

This present invention provides a portable navigation apparatus with a refueling prompt function, characterized in that the memory comprises a driving style table and a fuel consumption reference database, and the processing unit comprises a fuel recording unit and a refueling prompt unit. Wherein, while a vehicle approaches a gas station near the navigation route, or while a new route or a re-planned route is generated, the refueling prompt unit is able to automatically calculate forecasting fuel consumption required for traveling from a current location to a next gas station near a navigation route according to the navigation route generated by the route navigation unit, the driving style table and the fuel consumption reference database, and prompting an alarm signal when the forecasting fuel consumption is greater than the fuel quantity to remind a user to refuel firstly.

18 Claims, 6 Drawing Sheets

PORTABLE NAVIGATION APPARATUS WITH REFUELING PROMPT FUNCTION AND METHOD THEREOF

BACKGROUND OF THE INVENTION

1. Field of the Invention

This invention relates to a portable navigation apparatus and a method thereof, and more particularly, to a portable navigation apparatus with a refueling prompt function and a method thereof.

2. Description of the Prior Art

The portable navigation apparatus is getting popular at present with emerging technology, and especially these portable navigation apparatuses further comprise the composition of navigation, memo, communication and entertainment by unifying various features of PDA, cellular phone or MP3 player, etc. However, related to navigation, users are most concerned about the fuel problem, namely, if the fuel capacity is adequate to accomplish the navigation route. At present, the vehicle computer is mostly equipped with a fuel prompt system, but on the contrary, the populated portable navigation apparatuses are short of refueling prompt functions. Since the portable navigation apparatus is broadly populated with enhanced features, it would be great beneficial to have the refueling prompt function deployed in the portable navigation apparatus. However, the portable navigation apparatus is surely different from the vehicle computer, which can not monitor the driving status as well as fuel capacity, and hence, the portable navigation apparatus has not yet equipped such refueling prompt function on the present market.

Please referring to FIG. 1 for a block diagram of the portable navigation apparatus in accordance with the prior art. As illustrated, the portable navigation apparatus 10 acquires satellite positioning data via a GPS satellite 11, and the GPS receiver 12 transmits the satellite positioning data to the processing unit 13. After the processing unit 13 comprehends the current position of the portable navigation apparatus 10, the needed electronic map is then retrieved from the electronic map database 14 so as to acquire the geographic relation between the portable navigation apparatus 10 and the destination. The portable navigation apparatus 10 further comprises a display unit 15, an audio output unit 16 and an input unit 17 regarded as the operation interface communicating with a user, by which the user can enter the planned destination. Lastly, the processing unit 13 proceeds the mathematic operation via a route navigation unit 131 so as to provide the user with a navigation route. The route navigation unit 131 may be implemented by loading and executing computer codes of route navigation embedded in the memory 18. The above-mentioned work flow is the original model of various portable navigation apparatuses on the present market. Hence it is needed to rely on engineering efforts to integrate such a refueling prompt function into the portable navigation apparatus.

According to the problem described above, the inventor of the invention herein conducted extensive research and experimentation that culminated in the successful development and design; hence a portable navigation apparatus with a refueling prompt function is addressed as the foundation and the realization for improving described problems.

SUMMARY OF THE INVENTION

An objective of the present invention is to provide a portable navigation apparatus with a refueling prompt function and a method thereof so as to integrate the refueling prompt function into the portable navigation apparatus.

According to the objective of the present invention, a portable navigation apparatus with a refueling prompt function is provided. The portable navigation apparatus with the refueling prompt function comprises a display unit, an audio output unit, an input unit, a processing unit, an electronic map database, a memory and a GPS receiver for receiving the satellite positioning data from a GPS satellite, wherein the processing unit comprises a route navigation unit for generating a navigation route. The portable navigation apparatus of the present invention is characterized in that the memory comprises a driving style table and a fuel consumption reference database, and the processing unit further comprises a fuel recording unit and a refueling prompt unit. The route navigation unit, the fuel recording unit and the refueling prompt unit may be implemented by loading and executing computer codes of route navigation, fuel recording and refueling prompt embedded in the memory, respectively. The driving style table records a plurality of road ranks and a plurality of corresponding average vehicle speeds in accordance with a driving style of a user, and the fuel consumption reference database stores relations between vehicle velocities and fuel consumption rates. The fuel recording unit records fuel quantity. The refueling prompt unit is able to automatically calculate the forecasting fuel consumption required for traveling from a current location to a next gas station near the navigation route according to the navigation route, the driving style table and the fuel consumption reference database while the current location approaches a gas station near the navigation route, or while a new navigation route or a re-planned route is generated, and is able to prompt an alarm signal when the forecasting fuel consumption is greater than the fuel quantity.

According to the objective of the present invention, a method for performing a refueling prompt function on a portable navigation apparatus is provided, comprising the following steps: a driving style table is established to record a plurality of road ranks and a plurality of corresponding average vehicle speeds in accordance with a driving style of a user; a fuel consumption reference database is provided to store relations between vehicle velocities and fuel consumption rates; a fuel recording table is provided to record fuel quantity; the route navigation unit is used to generate a navigation route; and the refueling prompt unit is used to automatically calculate forecasting fuel consumption required for traveling from a current location to a next gas station near the navigation route according to the navigation route, the driving style table and the fuel consumption reference database while a vehicle is approaching a gas station near the navigation route, or while a new route or a re-planned route is generated, and to prompt an alarm signal when the forecasting fuel consumption is greater than the fuel quantity.

Here, the step of automatically calculating the forecasting fuel consumption further comprises the steps of: the navigation route from the current location to the next gas station is divided into a plurality of road sections; the road ranks of the road sections are determined; the average vehicle speeds of the road ranks are acquired to determine the corresponding fuel consumption rates of the road sections; each sectional fuel consumption of the road sections is calculated by multiplying each fuel consumption rate to each distance of the road sections; and all the sectional fuel consumptions is summed up to produce the forecasting fuel consumption As described above, followed by the portable navigation apparatus with the refueling prompt function according to the present invention, there may be following one or more advantages:

(1) The present invention can let a user know whether the current fuel quantity is sufficient for traveling to a next gas station nearby the navigation route or the destination; if not, the refueling prompt signal is generated to warn the user to refuel first so as to avoid running out of the fuel on the road.
(2) The present invention is able to categorize the roads into various ranks to improve fuel consumption rate estimation.
(3) The fuel consumption may be calculated in accordance with the driving style of the user.

With these and other objects, advantages, and features of the invention that may become hereinafter apparent, the nature of the invention may be more clearly understood by reference to the detailed description of the invention, the preferred embodiments and to the several drawings herein.

DETAILED DESCRIPTION OF THE PREFERRED EMBODIMENTS

The following is a brief description with the attached drawings in accordance with preferred embodiments of the portable navigation apparatus with the refueling prompt function. As for easier to understand the present invention, same elements are represented by identical numerical notation in the following embodiments.

Figure 1:
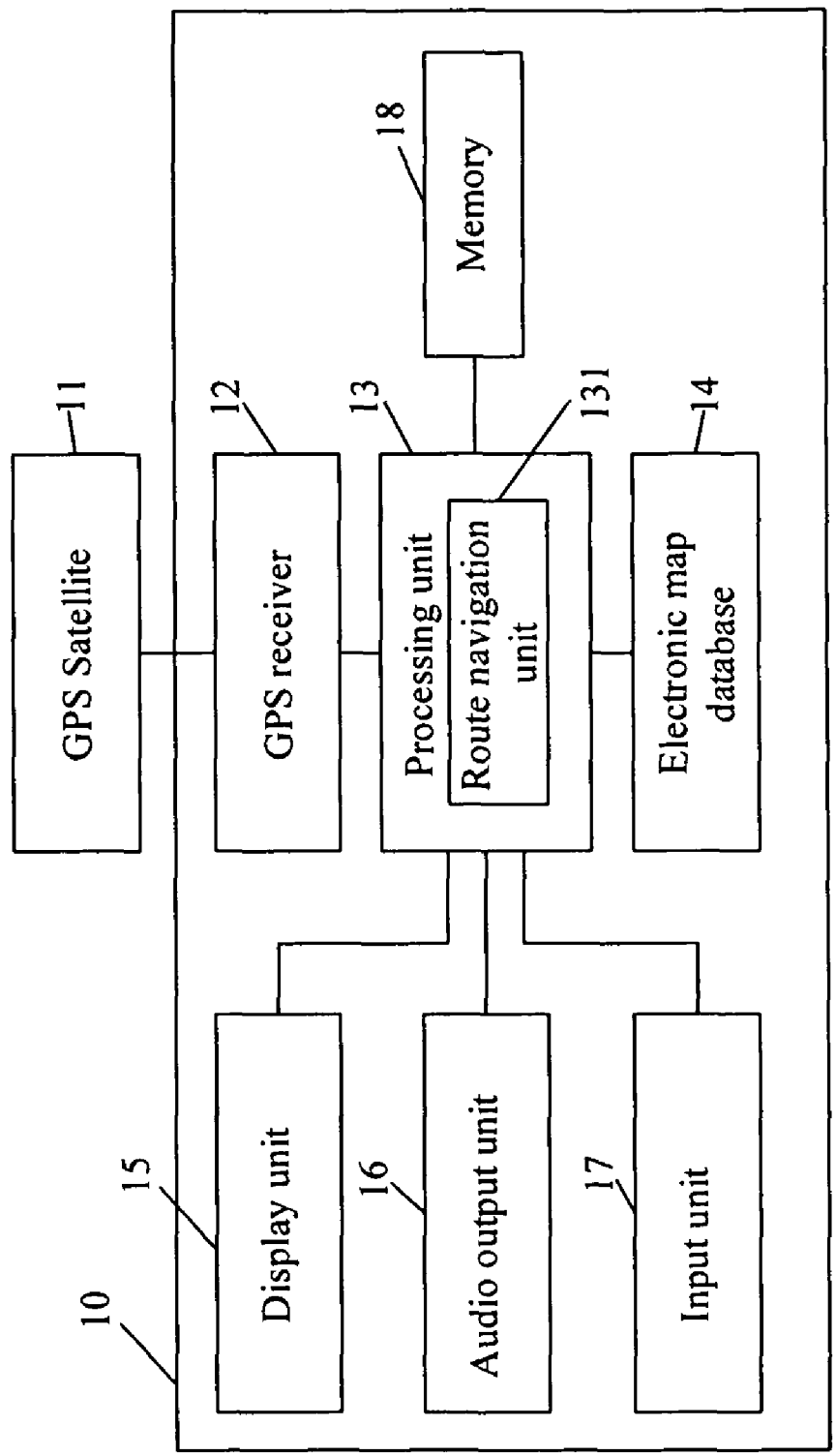
FIG. 1 illustrates a block diagram of a portable navigation apparatus in accordance with the prior art.
Figure 2:
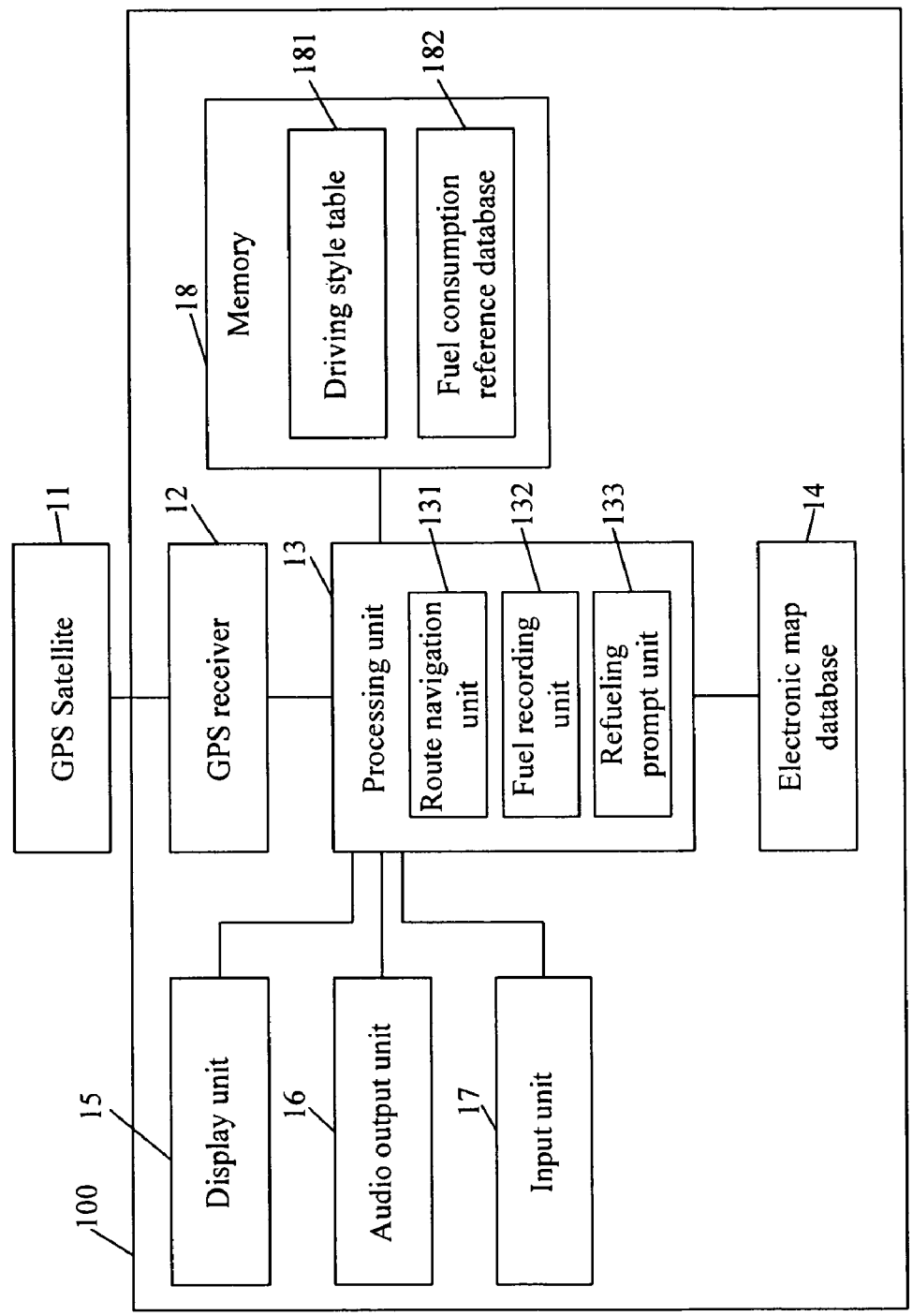
FIG. 2 illustrates a block diagram of a portable navigation apparatus with a refueling prompt function in accordance with the present invention.

With reference to FIG. 2 for a block diagram of a portable navigation apparatus with a refueling prompt function in accordance with the present invention, as illustrated, the portable navigation apparatus with the refueling prompt function 100 may comprise a GPS receiver 12 for receiving satellite positioning data from a GPS satellite 11, a processing unit 13, an electronic map database 14, a display unit 15, an audio output unit 16, an input unit 17, and a memory 18. It is noteworthy that the processing unit 13 may comprise a route navigation unit 131, a fuel recording unit 132 and a refueling prompt unit 133, and the memory 18 may comprise a driving style table 181 and a fuel consumption reference database 182. The route navigation unit 131, the fuel recording unit 132 and the refueling prompt unit 133 may be implemented by loading and executing computer codes of route navigation, fuel recording and refueling prompt embedded in the memory 18, respectively.

Herein, the route navigation unit 131 is arranged to generate a navigation route. The driving style table 181 may be capable of recording a plurality of road ranks and a plurality of corresponding average vehicle speeds in accordance with a driving style of a user. Preferably, the driving style table 181 may be determined by statistically analyzing the satellite positioning data received by the GPS receiver 12 during daily driving of the user or be provided by accepting manual inputs via the input unit 17, so as to obtain the average vehicle speeds corresponding to the plurality of road ranks for the user. Preferably, the memory 18 may comprise more than one the driving style table 181 to allow recording the driving styles of different users.

The fuel consumption reference database 182 may be used to store relations between vehicle velocities and fuel consumption rates. Preferably, the fuel consumption reference database 182 may be provided via a vehicle computer or by accepting manual inputs via the input unit 17. That is, the user can set the fuel consumption reference database 182 manually. For example, the user can obtain the fuel consumption data of his/her vehicle from a manufacturer. Generally, the vehicle manufacturer can provide the fuel consumption rates of the vehicle in different velocities. However, the fuel consumption data of the vehicle substantially depend on the user's driving habit and road conditions such as a traffic jam or traffic lights, so the fuel consumption reference database 182 is also able to establish by recording the fuel consumption data during common driving in accordance with present invention. Besides, if portable navigation apparatus 100 is connected to the vehicle computer, the fuel consumption reference database 182 may be obtained from the vehicle computer. The skill of recording the fuel consumption data is well known so that we do not explain it in detail.

Moreover, the fuel recording unit 132 may be able to record fuel quantity. Preferably, the fuel recording unit 132 is provided via a vehicle computer or by accepting manual inputs via the input unit. Besides, the fuel recording unit 132 may be further capable of prompting an operation interface to allow the user to enter the fuel quantity while the vehicle enters a gas station. The operation interface may comprise various optional buttons or icons, such as filled fully, how much fuel being filled, how much money being paid for the fuel, to let the user to enter the fuel quantity for this refueling. For example, the fuel recording unit 132 may comprise a refueling button to provide the traveling distance between refuelings for calculating the average fuel consumption rate. Each time the empty fuel tank of the vehicle is filled fully, the driver can press the refueling button to acquire the total traveling distance of the vehicle between the current refueling and the previous refueling recorded by the portable navigation apparatus, and the traveling distance and the capacity of the fuel tank may be used as the denominator and the numerator respectively to calculate the average fuel consumption rate. Such information may also be used as a source of the fuel consumption reference database 182.

Figure 4:
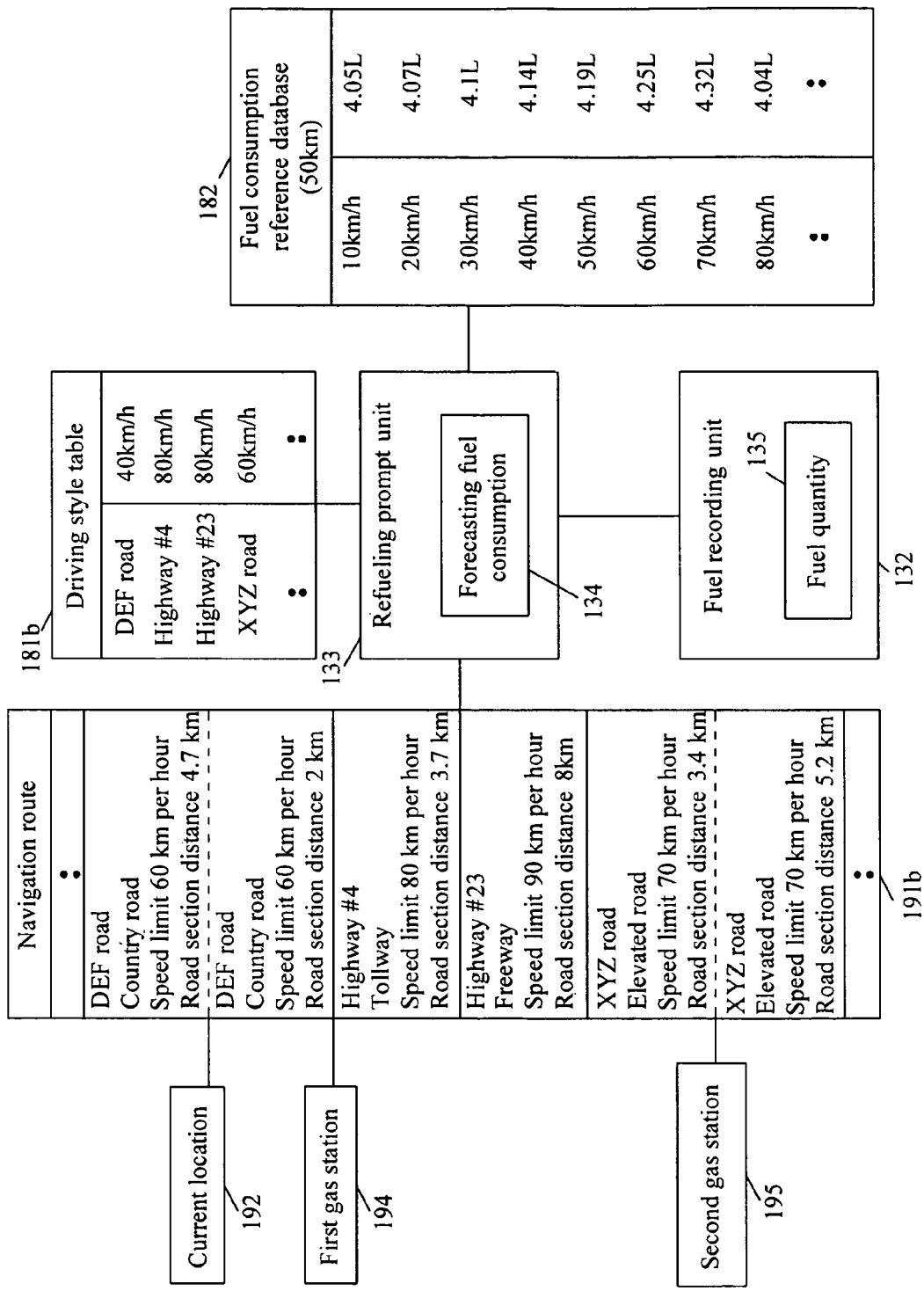
FIG. 4 illustrates a schematic view of a portable navigation apparatus with a refueling prompt function in accordance with a second embodiment of the present invention.

Furthermore, the refueling prompt unit 133 may be applicable of automatically calculating the forecasting fuel consumption required for traveling from a current location to a next gas station near the navigation route (herein, "near" may be referred as the coordinate of the gas station is apart from the navigation route with a distance being smaller than a predetermined threshold, for instance 0.5 kilometers) according to the navigation route, the driving style table and the fuel consumption reference database while a vehicle is approaching a gas station near the navigation route ("approach", namely, the distance between a current location 192 of the vehicle and first gas station 194 is smaller than a predetermined threshold, for instance 2 kilometers, as shown in FIG. 4), or while a new route or a re-planned route is generated, and prompting an alarm signal when the forecasting fuel consumption is greater than the fuel quantity. Therefore, when the fuel quantity of vehicle is below the forecasting fuel consumption, namely, the navigation route is not able to be completed with the remaining fuel, the portable navigation apparatus with the refueling prompt function 100 of the present invention will notify the user to refuel promptly in the form of, for example, a warning sound or a flashing light respectively via the display unit 15 or the audio output unit 16 to prevent the vehicle from breaking down on the road.

In addition, the portable navigation apparatus with the refueling prompt function 100 may further comprise a fueling button. The fueling button can be represented in the form of an icon or a key. When the user presses the refueling button, the route navigation unit 131 is capable of searching a nearby gas station around the user and provides a navigation route guiding the user to the nearby gas station. Moreover, when detecting the current vehicle position of the portable navigation apparatus 100 is a gas station, an operation interface may be then prompted and displayed on the display unit 15 to provide the user to enter the fueling quantity for the time being.

Figure 3:
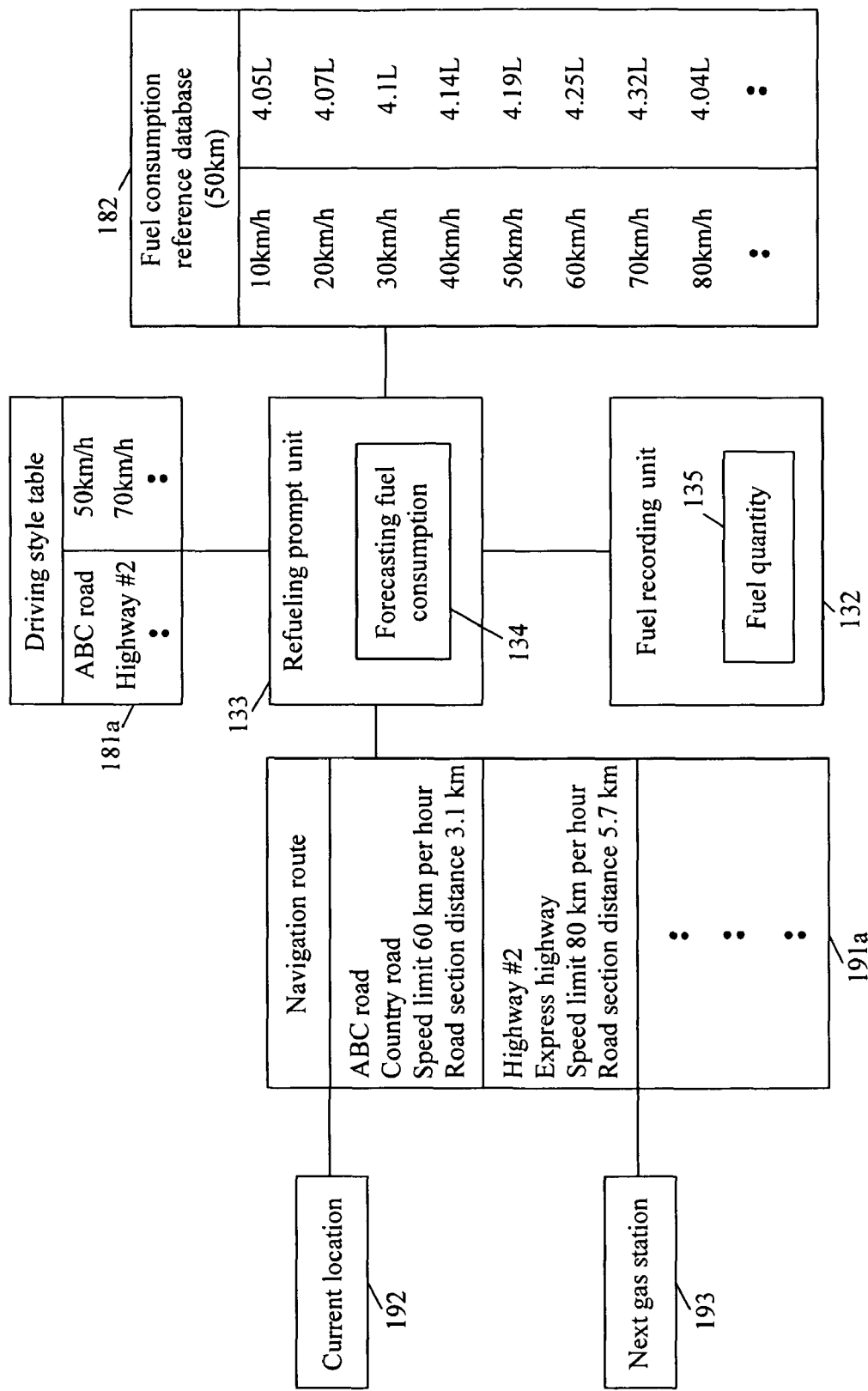
FIG. 3 illustrates a schematic view of a portable navigation apparatus with a refueling prompt function in accordance with a first embodiment of the present invention.

Please refer to FIG. 3 for a schematic view of a portable navigation apparatus with a refueling prompt function in accordance with a first embodiment of the present invention. As illustrated, while a new route or a re-planned route is generated, for example, a user just turning on the portable navigation apparatus or changing a route or destination, a refueling prompt unit 133 may firstly analyze and divide a navigation route 191$a$ from a current location 192 to a next gas station 193 into a plurality of road sections, and determine the road rank of each road section, such as an express highway, freeway, tollway, plane road, elevated road, city road or country road with various speed limits, so as to acquire the average vehicle speeds of the road ranks to determine the corresponding fuel consumption rates whose unit is, for example, fuel volume per unit distance, of the road sections according to a driving style table 181$a$ and a fuel consumption reference database 182. Then, the sectional fuel consumption of each road section is calculated by multiplying each fuel consumption rate to the distance of each road sections and subsequently summed up the sectional fuel consumptions to produce forecasting fuel consumption 134. Herein, the functions and properties of each component in the processing unit 13 and the memory 18 are analogous to the FIG. 2, and thus descriptions thereof are omitted for brevity.

That is, if the portable navigation apparatus is required to re-calculate a new navigation route, for example, the user changing destination or turning in wrong intersection, after the new navigation route is calculated, the refueling prompt unit 133 will search the next gas station 193 near the new navigation route and do the above-mentioned fuel checking process again. For instance, as shown in the FIG. 3, a new navigation route is generated, and a ABC road and Highway #2 are included in the navigation route 191$a$ from the current location 192 to the next gas station 193, and the average vehicle speed is 50 km/h on ABC road and the average vehicle speed is 70 km/h on Highway #2 for a user according to the driving style table 181$a$. The distances of the ABC road and the Highway #2 are respectively 3.1 km and 5.7 km from the current location 192 to the next gas station 193. Thus, the forecasting fuel consumption 134 is the sum of 4.19 L divided by 50 km then multiplied 3.1 km and 4.32 L divided by 50 km then multiplied 5.7 km. Next, while the forecasting fuel consumption 134 is greater than the fuel quantity 135 of the fuel recording unit 132, an alarm signal is generated by the refueling prompt unit 133 to remind the user to refuel firstly.

Please refer to FIG. 4 for a schematic view of a portable navigation apparatus with a refueling prompt function in accordance with a second embodiment of the present invention. As illustrated, while a vehicle approaches a first gas station 194 near the navigation route 191$b$, a refueling prompt unit 133 may firstly analyze and divide a navigation route 191$b$ from the current location 192 to a second gas station 195 (i.e. next gas station) into a plurality of road sections, and determine the road rank of each road section, such as an express highway, freeway, tollway, plane road, elevated road, city road or country road with various speed limits (or may firstly analyze and determine the road ranks of the navigation route 191$b$, and then divide the navigation route 191$b$ from the current location 192 to a second gas station 195 into a plurality of road sections based on the road ranks), so as to acquire the average vehicle speeds of the road ranks to determine the corresponding fuel consumption rates whose unit is, for example, fuel volume per unit distance, of the road sections according to a driving style table 181$b$ and a fuel consumption reference database 182. Then, the sectional fuel consumption of each road section is calculated by multiplying each fuel consumption rate to the distance of each road sections and subsequently summed up the sectional fuel consumptions to produce forecasting fuel consumption 134. Herein, the functions and properties of each component in the memory 180 are analogous to the FIG. 2, and thus descriptions thereof are omitted for brevity.

For instance, as shown in the FIG. 4, a DEF road, Highway #4, Highway #23 and XYZ road are included in the navigation route 191$b$ from the current location 192 to the second gas station 195, and the average vehicle speeds for a user are respectively 40 km/h on DEF road, 80 km/h on Highway #4, 80 km/h on Highway #23, 60 km/h on XYZ road according to the driving style table 181$b$ from the current location 192 to the second gas station 195. The distances of the DEF road, Highway #4, Highway #23 and XYZ road are respectively 2 km, 3.7 km, 8 km and 3.4 km. Thus, the forecasting fuel consumption 134 is the sum of 4.14 L divided by 50 km then multiplied 2 km, 4.04 L divided by 50 km then multiplied 3.7 km, 4.04 L divided by 50 km then multiplied 8 km, and 4.25 L divided by 50 km then multiplied 3.4 km. Next, while the forecasting fuel consumption 134 is greater than the fuel quantity 135 of the fuel recording unit 132, an alarm signal is generated by the refueling prompt unit 133 to inform the user to refuel in the first gas station 194.

Figure 5:
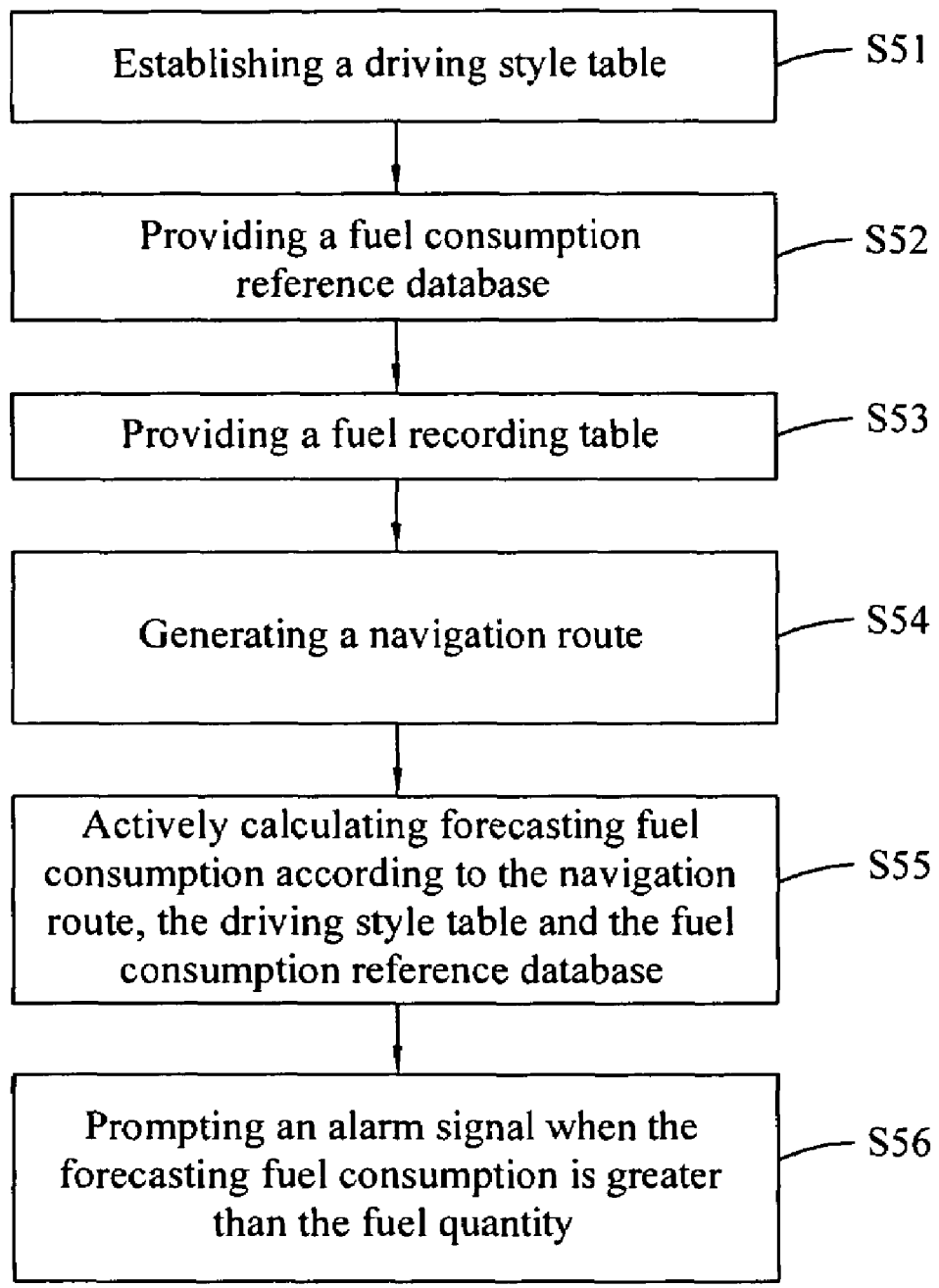
FIG. 5 illustrates a flow chart of a method for performing a refueling prompt function on a portable navigation apparatus in accordance with an embodiment of the present invention.

FIG. 5 illustrates a flow chart of a method for performing a refueling prompt function on a portable navigation apparatus in accordance with an embodiment of the present invention. As illustrated, the method is applied to the portable navigation apparatus to prevent a user from running out of fuel during traveling, comprising the following steps. In step S51, a driving style table, which records a plurality of road ranks and a plurality of corresponding average vehicle speeds in accordance with a driving style of a user, is established. Then, a fuel consumption reference database storing relations between vehicle velocities and fuel consumption rates is provided in step S52 and a fuel recording table recording fuel quantity is provided in step S53, and then a route navigation unit is able to generate a navigation route from a start to a destination in step S54. Because the skill of generating a navigation route is well-known, it does not be described in detail.

In step S55, forecasting fuel consumption required for traveling from a current location to a next gas station near the navigation route is automatically calculated according to the navigation route, the driving style table and the fuel consumption reference database by using a refueling prompt unit while the current location approaches a gas station near the navigation route, or while a new route or a re-planned route is generated. Then, in step S56, when the forecasting fuel consumption is greater than the fuel quantity, the alarm signal is prompted to the user. For example, if the forecasting fuel consumption is 10.5 L, but the fuel quantity is 6 L, it is to say that the user can not reach the destination without refueling, so the alarm signal is generated and outputted in visual or audible form to remind the user to refuel first.

Figure 6:
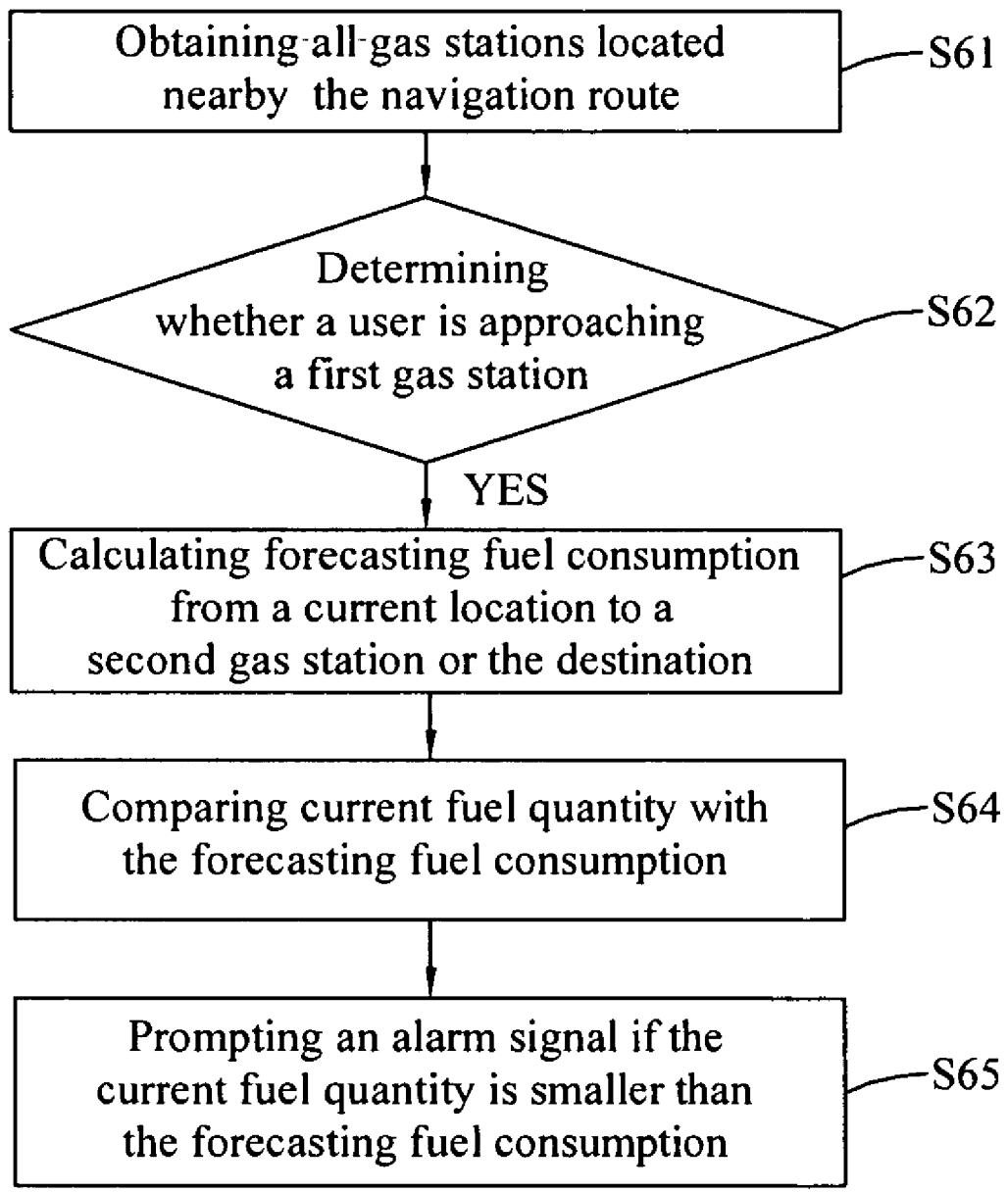
FIG. 6 illustrates a flow chart of a method for performing a refueling prompt function on a portable navigation apparatus in accordance with another embodiment of the present invention.

FIG. 6 illustrates a flow chart of a method for performing a refueling prompt function on a portable navigation apparatus in accordance with another embodiment of the present invention. In the figure, a user is traveling according to a navigation route and the refueling prompt function is performed for reminding the user to refuel, comprising the following steps. In step S61, all gas station located nearby the navigation route is obtained. In step S62, it is determined whether the user approaches a first gas station. Wherein, the portable navigation apparatus can generate the current location of the user in real time, and it is determined that the user approaches the first gas station if the distance between the user's current location and the first gas station is smaller than a predetermined threshold.

In step S63, if the user is approaching the first gas station, forecasting fuel consumption required from the current location to the second gas station (i.e. the next gas station) is calculated. Or, if the nearby gas station is the last one the user will meet on this navigation route, then the forecasting fuel consumption to the destination is calculated.

In step S64, the current fuel quantity is obtained and compared with the forecasting fuel consumption, and the alarm signal is generated in step S65 if current fuel quantity is smaller than the forecasting fuel consumption. Preferably, the alarm signal is outputted in visual form or audible form to remind the user to refuel in the previous gas station, otherwise it is possible that the user can not reach the next gas station or destination.

The aforementioned descriptions are simply exemplary, rather than being restrictive. All effectively equivalent modifications or changes made on the illustrated embodiments without departing from the scope and spirit of the present invention are deemed to be encompassed by the following claims.

What is claimed is:

1. A portable navigation apparatus with a refueling prompt function, comprising a display unit, an audio output unit, an input unit, a processing unit, an electronic map database, a memory and a GPS receiver for receiving satellite positioning data from a GPS satellite, the processing unit comprising a route navigation unit for generating a navigation route; characterized in that:
   the memory comprising:
      a driving style table recording a plurality of road ranks and a plurality of corresponding average vehicle speeds in accordance with a driving style of a user; and
      a fuel consumption reference database storing relations between vehicle velocities and fuel consumption rates; and
   the processing unit further comprising:
      a fuel recording unit recording fuel quantity; and
      a refueling prompt unit automatically calculating forecasting fuel consumption required for traveling from a current location to a next gas station near the navigation route according to the navigation route, the driving style table and the fuel consumption reference database while the current location approaches a gas station near the navigation route, or while a new route or a re-planned route is generated, and prompting an alarm signal when the forecasting fuel consumption is greater than the fuel quantity.

2. The portable navigation apparatus according to claim 1, wherein the refueling prompt unit divides the navigation route from the current location to the next gas station into a plurality of road sections, determines the road ranks of the road sections, acquires the average vehicle speeds of the road ranks to determine the corresponding fuel consumption rates of the road sections, and calculates each sectional fuel consumption of the road sections by multiplying each fuel consumption rate to each distance of the road sections, so as to sum up the sectional fuel consumptions to produce the forecasting fuel consumption.

3. The portable navigation apparatus according to claim 1, wherein the driving style table is determined by statistically analyzing the satellite positioning data received by the GPS receiver during daily driving of the user, so as to obtain the average vehicle speeds corresponding to the plurality of road ranks of the user.

4. The portable navigation apparatus according to claim 1, wherein the driving style table is provided by accepting manual inputs via the input unit.

5. The portable navigation apparatus according to claim 1, wherein the fuel consumption reference database is provided via a vehicle computer or by accepting manual inputs via the input unit.

6. The portable navigation apparatus according to claim 1, wherein the fuel recording unit is provided via a vehicle computer, or by accepting manual inputs via the input unit.

7. The portable navigation apparatus according to claim 6, wherein the fuel recording unit further prompts an operation interface to allow the user to enter the fuel quantity while the vehicle enters a gas station.

8. The portable navigation apparatus according to claim 1, wherein the fuel recording unit further comprises a refueling button being pressed each time when a fuel tank of the vehicle is filled from empty to full, the refueling button provides a traveling distance of the vehicle between a current refueling and a previous refueling after being pressed, and an average fuel consumption rate is calculated according to the traveling distance and a capacity of the fuel tank.

9. The portable navigation apparatus according to claim 1, wherein the road ranks comprise an express highway, freeway, tollway, plane road, elevated road, city road or country road.

10. A method for performing a refueling prompt function on a portable navigation apparatus, comprising the steps of:
   establishing a driving style table recording a plurality of road ranks and a plurality of corresponding average vehicle speeds in accordance with a driving style of a user;
   providing a fuel consumption reference database storing relations between vehicle velocities and fuel consumption rates;
   providing a fuel recording table recording fuel quantity;
   generating a navigation route;
   automatically calculating forecast fuel consumption required for traveling from a current location to a next gas station near the navigation route according to the navigation route, the driving style table and the fuel consumption reference database while the current location approaches a gas station near the navigation route, or while a new route or a re-planned route is generated; and prompting an alarm signal when the forecast fuel consumption is greater than the fuel quantity by the refueling prompt unit.

11. The method according to claim 10, wherein the step of automatically calculating the forecasting fuel consumption further comprises steps of:
dividing the navigation route from the current location to the next gas station into a plurality of road sections;
determining the road ranks of the road sections;
acquiring the average vehicle speeds of the road ranks to determine the corresponding fuel consumption rates of the road sections;
calculating each sectional fuel consumption of the road sections by multiplying each fuel consumption rate to each distance of the road sections; and
summing up the sectional fuel consumptions to produce the forecasting fuel consumption.

12. The method according to claim 10, wherein the driving style is determined by statistically analyzing satellite positioning data received by a GPS receiver during daily driving of the user, so as to obtain the average vehicle speeds corresponding to the plurality of road ranks of the user.

13. The method according to claim 10, wherein the driving style table is provided by accepting manual inputs via the input unit.

14. The method according to claim 10, wherein the fuel consumption reference database is provided via a vehicle computer or by accepting manual inputs via the input unit.

15. The method according to claim 10, wherein the fuel recording unit is provided via a vehicle computer, or by accepting manual inputs via the input unit.

16. The method according to claim 15, wherein the fuel recording unit further prompts an operation interface to allow the user to enter the fuel quantity while the vehicle enters a gas station.

17. The method according to claim 10, wherein the fuel recording unit further comprises a refueling button being pressed each time when a fuel tank of the vehicle is filled from empty to full, the refueling button provides a traveling distance of the vehicle between a current refueling and a previous refueling after being pressed, and an average fuel consumption rate is calculated according to the traveling distance and a capacity of the fuel tank.

18. The method according to claim 10, wherein the road ranks comprise an express highway, freeway, tollway, plane road, elevated road, city road or country road.

* * * * *